(12) United States Patent
Honda et al.

(10) Patent No.: US 8,687,729 B2
(45) Date of Patent: Apr. 1, 2014

(54) RADIO DEVICE, COMMUNICATION CONTROL METHOD, AND RADIO COMMUNICATION SYSTEM

(75) Inventors: Atsushi Honda, Kawasaki (JP); Teruhisa Ninomiya, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 86 days.

(21) Appl. No.: 13/403,143

(22) Filed: Feb. 23, 2012

(65) Prior Publication Data

US 2012/0243584 A1    Sep. 27, 2012

(30) Foreign Application Priority Data

Feb. 24, 2011    (JP) .................................. 2011-038728

(51) Int. Cl.
*H04L 1/02*    (2006.01)
(52) U.S. Cl.
USPC .......................................................... 375/267
(58) Field of Classification Search
USPC .......... 375/267, 219, 344, 347, 349; 455/101, 455/277.1, 226.1, 226.2
See application file for complete search history.

(56) References Cited

U.S. PATENT DOCUMENTS

| 5,781,592 | A | 7/1998 | Masuda | |
|---|---|---|---|---|
| 2006/0067442 | A1* | 3/2006 | Tanaka | 375/347 |
| 2009/0168734 | A1* | 7/2009 | Cho | 370/338 |
| 2009/0258622 | A1* | 10/2009 | Ruijter | 455/226.3 |

FOREIGN PATENT DOCUMENTS

| JP | 10-163939 | 6/1998 |
|---|---|---|
| JP | 2003-060541 | 2/2003 |
| JP | 2004-15089 | 1/2004 |
| WO | 95/09495 | 4/1995 |

* cited by examiner

*Primary Examiner* — Khai Tran
(74) *Attorney, Agent, or Firm* — Katten Muchin Rosenman LLP

(57) ABSTRACT

A radio device including a plurality of antennas transmitting and receiving a signal a reception band filter which controls a pass frequency band a measuring circuit which measures a reception level of the signal received by each of the plurality of antennas in a preamble in the signal received through the reception band filter an antenna switch which switches the plurality of antennas based on a measurement result from the measuring circuit and a processor which controls transmission and reception of the signal of the radio device and a pass frequency band of the reception band filter, and which transmits, based on a packet density, an instruction for changing the preamble from a first data length to a second data length to the other radio device and for changing the pass frequency band of the reception band filter from a first band to a second band.

18 Claims, 13 Drawing Sheets

FIG. 4

| GROUP ID | MAC ADDRESS | NETWORK ADDRESS | DEVICE TYPE |
|---|---|---|---|
| 01 | 00-af-0e-b1-32 | 0x07 | ROUTER |
| 01 | 04-5c-1b-4d-f2 | 0x1F | ROUTER |
| 01 | 41-df-83-f9-3b | 0x51 | END DEVICE |
| 02 | 06-1b-a3-41-3a | xxxx | COORDINATOR |
| 02 | 00-af-0e-b1-a1 | xxxx | ROUTER |
| ... | | | |

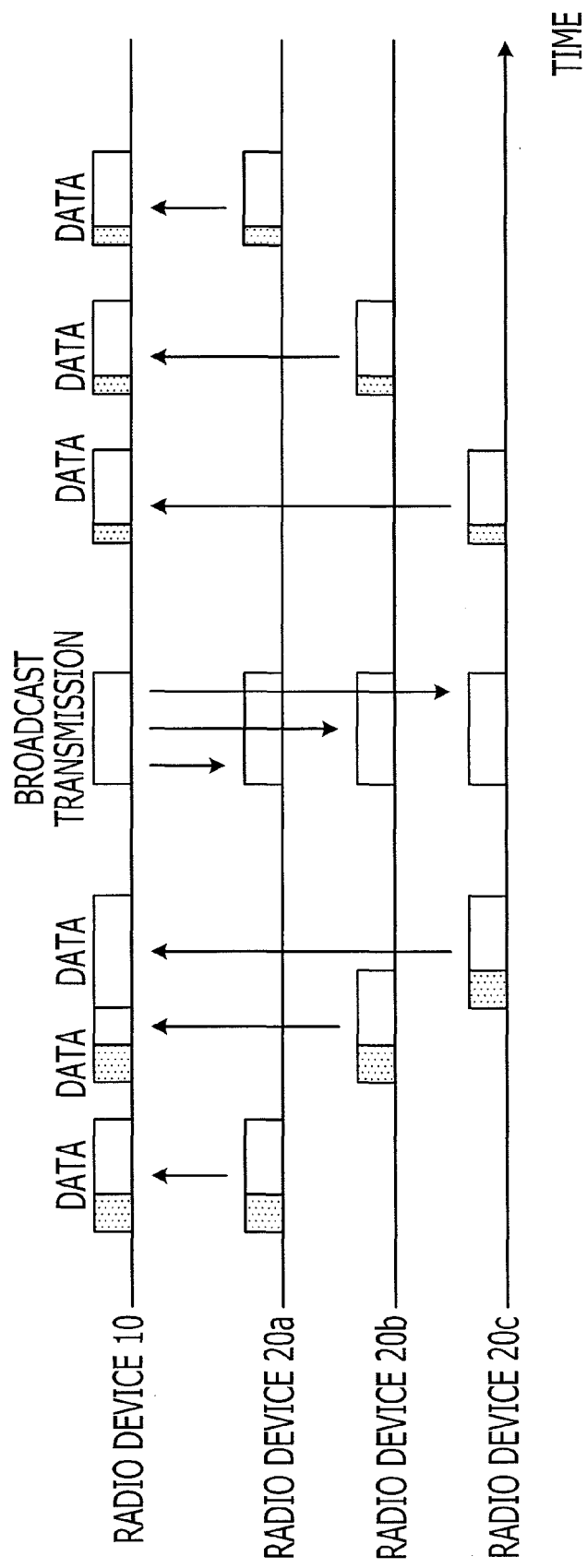

RADIO DEVICE, COMMUNICATION CONTROL METHOD, AND RADIO COMMUNICATION SYSTEM

CROSS-REFERENCE TO RELATED APPLICATIONS

This application is based upon and claims the benefit of priority from the prior Japanese Patent Application No. 2011-38728, filed on Feb. 24, 2011, the entire contents of which are incorporated herein by reference.

FIELD

The embodiments discussed herein are related to a radio device, a communication control method of the radio device, and a radio communication system that includes the radio device.

BACKGROUND

In a radio communication, a diversity receiving method for receiving a signal by using a plurality of antennas is considered effective to reduce an influence of reception electric field reduction due to fading. The radio device that employs the above-described method will be described in the following prior art document.

There is a known selection diversity receiving method for receiving a signal with an antenna with a higher reception electric field from among the plurality of antennas. According to the selection diversity receiving method, since one system of equipment for reception in a device is used to correspond to a plurality of antennas, the cost of the device configuration may be reduced. According to the selection diversity receiving method, a reception electric field of each antenna in the reception time of the preamble of the radio packet is measured, for example. The control is performed so that the antenna with a higher reception electric field is switched as an antenna for reception. Accordingly, to select a proper reception antenna, a sufficient time for measuring the reception electric field strength is desired. In other words, a preamble with a sufficient length is desired.

PRIOR ART DOCUMENT

Patent Document

[Patent Document 1] International Publication Pamphlet No. WO95/09495
[Patent Document 2] Japanese Laid-open Patent Publication No. 2003-060541
[Patent Document 3] Japanese Laid-open Patent Publication No. 10-163939
[Patent Document 4] Japanese Laid-open Patent Publication No. 2004-015089

SUMMARY

According to an aspect of the invention, a radio device including a plurality of antennas transmitting and receiving a signal to and from another radio device, a reception band filter which controls a pass frequency band; a measuring circuit which measures a reception level of the signal received by each of the plurality of antennas in a preamble in the signal received through the reception band filter, an antenna switch which switches the plurality of antennas based on a measurement result from the measuring circuit, and a processor which controls transmission and reception of the signal of the radio device and a pass frequency band of the reception band filter, and which transmits, based on a packet density, an instruction for changing the preamble from a first data length to a second data length to the other radio device and for changing the pass frequency band of the reception band filter from a first band to a second band. The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 4 is a diagram illustrating a configuration example of an adjacent terminal table;

FIG. 7 is a diagram illustrating a mode of time series packet transmission/reception by a CSMA/CA method;

DESCRIPTION OF EMBODIMENTS

In a system in which a plurality of terminals shares a limited space (that is, a band) such as a sensor network or a wireless Local Area Network (LAN), a Carrier Sense Multiple Access/Collision Avoidance (CSMA/CA) method is used in most cases. In the above-described system, if the number of radio devices transmitting/receiving packets is increased and if a packet density in the space is increased, packet collision occurs. As a result, proper packet reception may not be performed. According to the CSMA/CA method, to avoid the packet collision, when transmitting a signal, each of the radio devices determines whether another radio device located around the radio device transmits a packet. If the radio device determines that the other radio device does not transmit the signal, the radio device performs the control of transmitting the signal.

However, there are still technical problems. For example, the transmission delays if the time in which the radio devices may not transmit the packets in the state where the packet density in the space is increased. Furthermore, the packet collision is not avoided sufficiently in the state where the packet density is too high. To solve the above-described problems, by reducing the transmission time length such as a preamble of each packet, the packet collision may be avoided, and the reduction of the time in which the packet may not be transmitted may be reduced. However, according to the selection diversity receiving method, as described above, the preamble of which the length that is longer to some extent is desired for the reception antenna selection. Due to this, the selection diversity receiving method has a trade-off relation with respect to the reduction of the transmission time length of the packet to avoid the packet collision.

To solve the above-described technical problems, an aspect of the present invention is to provide a radio device, a method, and a radio communication system for avoiding the packet collision while a preferable radio communication and a selection diversity control are maintained even if there is a plurality of radio devices and if the packet density in the space is increased.

The embodiments of the present invention will be described below.

(1) Configuration Example

Figure 1:
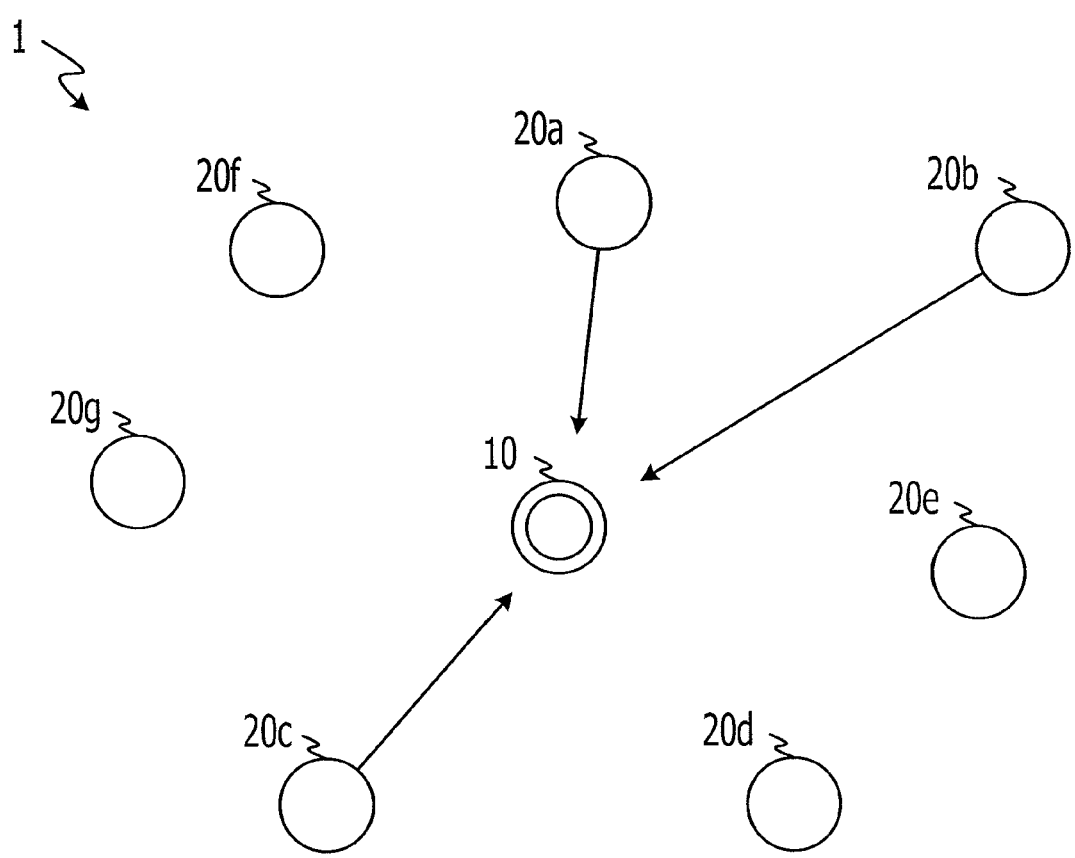
FIG. 1 is a diagram illustrating an overview of a radio communication network in which there is a plurality of radio devices.

With reference to FIG. 1, a configuration example of a radio communication system that includes a disclosed radio device will be described. A radio communication network 1 illustrated in FIG. 1 includes a plurality of radio devices that are communicable with each other.

A radio device 10 as an example of the disclosed radio device is a terminal for communication that may transmit and receive a radio signal by a radio communication according to a prescribed protocol of a radio sensor network or the like. The radio device 10 performs communication of packetized data by transmitting/receiving the radio signal among radio devices 20a to 20g located around the radio device 10.

The radio devices 20a to 20g are other radio devices located around the radio device 10. Each of the radio devices 20a to 20g may have the configuration equivalent to the radio device 10. For example, each of the radio devices 20a to 20g may include hardware, software, functions, and other characteristics equivalent to the configuration of the radio device 10 described below. Hereinafter, the radio devices located around the radio device 10 are referred to as the radio devices 20a to 20g to be described separately from the radio device 10. Furthermore, hereinafter, if the radio devices 20a to 20g are described not separately from each other, the radio devices 20a to 20g are collectively referred to as the radio device 20.

Figure 2:
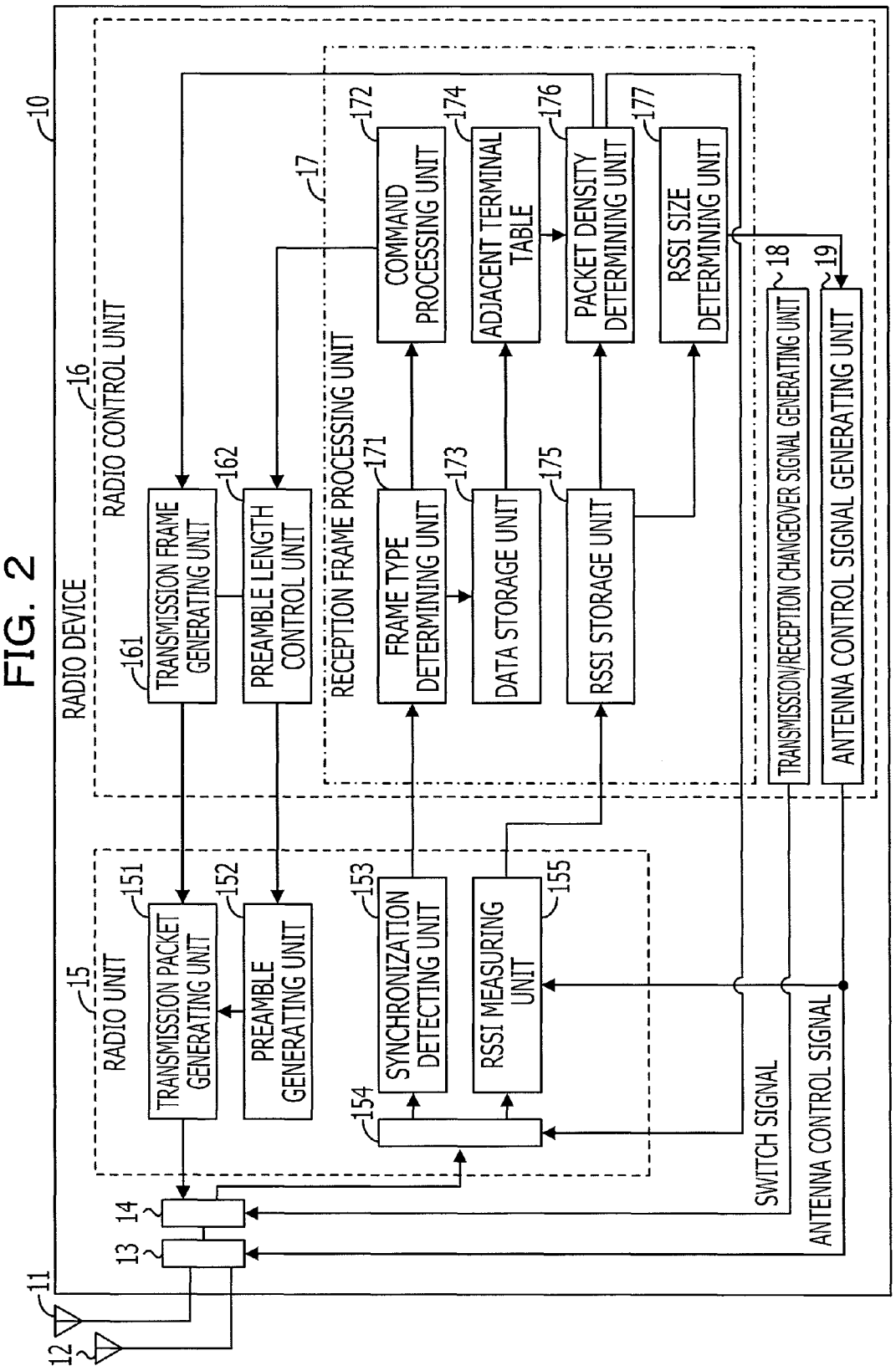
FIG. 2 is a diagram of a configuration example of a radio device.

With reference to FIG. 2, a configuration example of the radio device 10 will be described. FIG. 2 is a block diagram illustrating a hardware configuration of the radio device 10 and function units included in each configuration.

The radio device 10 includes a first antenna 11, a second antenna 12, an antenna changeover switch 13, a Transmission/Reception (T/R) switch 14, a radio unit 15, and a radio control unit 16. The radio unit 15 handles analog high frequency signals. The radio unit 15 is achieved by an analog circuit, for example. The analog circuit includes, for example, an amplifier, a filter, a mixer, a converter, a phase locked loop (PLL). The radio control unit 16 handles digital baseband signals. The radio control unit 16 is achieved by a digital circuit that includes a processor and a memory, for example. The processor is, for example, a central processing unit (CPU) and a digital signal processor (DSP). The memory is, for example, a read only memory (ROM) or a random access memory (RAM). The digital circuit includes, for example, a large scale integration (LSI), a field-programming gate array (FPGA), and an application specific integrated circuit (ASIC). The radio device 10 includes an A/D (D/A) converter (not illustrated) between the radio unit 15 and the radio control unit 16. The A/D (D/A) converter performs interconversion between an analog signal and a digital signal.

The radio unit 15 includes a transmission packet generating unit 151, a preamble generating unit 152, a synchronization detecting unit 153, a reception band filter 154, and an RSSI measuring unit 155. The radio control unit 16 includes a transmission frame generating unit 161, a preamble length processor 162, a reception frame processing unit 17, a transmission/reception changeover signal generating unit 18, and an antenna control signal generating unit 19. The reception frame processing unit 17 includes a frame type determining unit 171, a command processing unit 172, a data storage unit 173, an adjacent terminal table 174, an RSSI storage unit 175, a packet density determining unit 176, and a RSSI size determining unit 177.

The first antenna 11 and the second antenna 12 are antennas for transmission/reception coupled with the antenna changeover switch 13, respectively. When receiving a radio signal, the first antenna 11 and the second antenna 12 output the reception signal to the radio unit 15 through the antenna changeover switch 13 and the T/R switch 14. The first antenna 11 and the antenna 12 transmits the transmission signal as a radio wave output from the radio unit 15 through the T/R switch 14, the antenna changeover switch 13, the first antenna 11 or the second antenna 12 selected by the antenna changeover switch 13. The radio device 10 may include three or more antennas.

The antenna changeover switch 13 is a switch that couples the first antenna 11 and the second antenna 12 with the T/R switch 14 and the radio unit 15. The antenna changeover switch 13 operates based on an antenna control signal that is generated by the antenna control signal generating unit 19 included in the radio control unit 16 and switches the coupling destination to the first antenna 11 or the second antenna 12.

The antenna changeover switch 13 includes a distributer (not illustrated) and outputs the reception signal output from the first antenna 11 and the reception signal output from the second antenna 12 to the T/R switch 14 in the distributer.

The T/R switch 14 couples the transmission packet generating unit 151 and the reception band filter 154 included in the radio unit 15 with the antenna changeover switch 13, the first antenna 11, and the second antenna 12, respectively. The T/R switch 14 operates based on the transmission/reception switch signal generated by the transmission/reception changeover signal generating unit 18 included in the radio control unit 16 and switches the coupling destination to either the transmission packet generating unit 151 or the reception band filter 154. Therefore, when the signal is transmitted, the transmission packet generating unit 151 is coupled with the antenna changeover switch 13, the first antenna 11, and the second antenna 12. When the signal is received, the reception band filter 154 is coupled with the antenna changeover switch 13, the first antenna 11, and the second antenna 12.

The radio unit 15 is a device for signal processing for transmitting/receiving the packet through the first antenna 11 and the second antenna 12. The radio unit 15 includes the transmission packet generating unit 151, the preamble generating unit 152, the synchronization detecting unit 153, the reception band filter 154, and the RSSI measuring unit 155.

The transmission packet generating unit 151 transmits the data for transmission generated by the transmission frame generating unit 161 of the radio control unit 16 through the first antenna 11 and the second antenna 12.

The preamble generating unit 152 generates and transmits a preamble with a length according to the control signal generated by the preamble length processor 162 of the radio control unit 16 to the transmission packet generating unit 151. The transmission packet generating unit 151 transmits the packet, in which the input preamble is added to the data for transmission, through the first antenna 11 and the second antenna 12.

The synchronization detecting unit 153 includes the reception band filter 154, the RSSI measuring unit 155 that measures a Received Signal Strength Indicator (RSSI) of the reception signal received through the first antenna 11 and the second antenna 12, and a demodulation circuit (not illustrated) that demodulates the received signal into data. The synchronization detecting unit 153 transmits the data generated by the demodulation circuit to a reception data processing unit 163 (not illustrated) of the radio control unit 16.

Regarding the reception signal that is input into the synchronization detecting unit 153, the reception band filter 154 is a digital filter through which a prescribed passband signal passes and reduces the other band signals. The passband of the reception band filter 154 is changeable according to the control signal from a filter band processor 164 (not illustrated) of the radio control unit 16.

The RSSI measuring unit 155 measures an RSSI corresponding to the reception power of the first antenna 11 and the second antenna 12, respectively, and outputs the RSSI to the reception data processing unit 163 (not illustrated). For example, the RSSI measuring unit 155 measures the RSSI of the signal received by the first antenna 11 for a prescribed time and then measures the RSSI for a prescribed time.

The prescribed time indicates a prescribed time during preamble reception that is added to the packet as an example of a transmission form of data by a signal. Specifically, the RSSI measuring unit 155 measures the RSSI value of the first antenna during the first period in the preamble reception term of the reception packet and measures the second antenna 12 RSSI value during the second term that is different from the first term during the preamble reception.

The radio control unit 16 includes a CPU and a memory and achieves each function illustrated in the function units described below if the CPU operates based on a program stored in the memory. The radio control unit 16 includes the transmission frame generating unit 161, the preamble length processor 162, a reception data processing unit 163 (not illustrated), the filter band processor 164 (not illustrated), the transmission/reception changeover signal generating unit 18, and the antenna control signal generating unit 19.

The transmission frame generating unit 161 generates a packet to be transmitted through the first antenna 11 and the second antenna 12 and outputs the packet to the transmission packet generating unit 151 of the radio unit 15. According to a determination result of the packet density described below, the transmission frame generating unit 161 generates and outputs a preamble reduction request message to the transmission packet generating unit 151 of the radio unit 15 through the first antenna 11 or the second antenna 12.

The preamble length processor 162 transmits a signal to specify the length of the preamble to be added to the packet to the preamble generating unit 152 of the radio unit 15. For example, the preamble length processor 162 instructs the preamble generating unit 152 to generate a preamble of 8 byte in normal communication and to generate a preamble that is shorter than 4 byte or the like according to the determination result of the packet density described below.

The reception data processing unit 163 (not illustrated) is a function unit that processes the packet received by the synchronization detecting unit 153. The received packet is subjected to data processing of voice, movie output, or the like through the output device (not illustrated).

The filter band processor 164 (not illustrated) changes a pass frequency band of the reception band filter 154 by changing a register value of the reception band filter 154 or the like.

The transmission/reception changeover signal generating unit 18 generates a control signal that switches the T/R switch 14 according to the transmission/reception operation in the radio unit 15.

The antenna control signal generating unit 19 generates a control signal that switches the antenna changeover switch 13 according to the RSSI of the reception signal measured by the RSSI measuring unit 155 or the like.

The packet density determining unit 176 determines the packet density around the radio device 10 based on a prescribed standard. For example, the packet density determining unit 176 may determine whether the packet density is high (for example, whether the packet density is higher than a prescribed threshold value, that is, whether the packet density is relatively high or not compared to a case where the prescribed threshold value is low). Alternatively, the packet density determining unit 176 determines whether the packet density is low (for example, whether the packet density is equal to or lower than a prescribed threshold value, that is, whether the packet density is relatively low or not compared to a case in which the packet density is high).

In a preferred embodiment, for example, the packet density determining unit 176 includes a memory with a database that stores the number of the radio devices 20 located around the radio device 10. In general, as the number of radio devices located in an area is increased, the frequency of transmission/reception of the signal in the area is increased, so that the packet density in the area gets higher. The packet density determining unit 176 has a prescribed threshold value as the number of the radio devices 20 located around the radio device 10. If the number of the radio devices 20 exceeds the threshold value, the packet density determining unit 176 determines that the packet density is relatively high. Based on the signal received through the first antenna 11 and the second antenna 12, the packet density determining unit 176 may perform the above-described determination in consideration of the number of devices that are operating such as devices transmitting the signal from among the radio devices 20 located around the radio device 10. The operation example of the radio device 10 described below will illustrate the operation for determining the packet density based on the number of the radio devices 20 located around the radio device 10.

The packet density determining unit 176 sets a prescribed threshold value to a reception level (for example, the RSSI value or the like) of the signal, which is transmitted from the radio device 20 located around the radio device 10 measured by the RSSI measuring unit 155, and determines the packet density is relatively high according to the number of measurement of the RSSI value that is larger than the threshold value. The present embodiment is adjustable in that the threshold value is set to the number of measurement of the RSSI value that is larger than the threshold value, and the packet density is determined to be relatively high when the measurement of the number that is larger than the threshold value is confirmed.

In another embodiment, the packet density determining unit 176 sets the prescribed threshold value to the number of signal retransmission in the radio device 10. If the detected number of retransmission is larger than the threshold value, the packet density is determined to be relatively high. In general, if the packet density is high around the radio device 10 that performs the communication by the CSMA/CA method, an error rate of packet inside the radio device 10 is increased, so that the number of packet retransmission is increased. As a result, if the number of packet retransmission in the radio device 10 is focused, the packet density around the radio device 10 may be estimated.

The packet density determining unit 176 may determine the packet density around the radio device 10 by using one of the above-described methods or by combining the above described methods. Furthermore, the packet density determining unit 176 may employ a method for detecting or estimating the packet density no matter whether the method is known or not.

With reference to FIG. 2, an operation sequence of each function unit of the radio device 10 will be described.

A transmission operation of the radio device 10 will be described.

When transmitting the data, the radio control unit 16 forms and transmits the data inside the data as a payload by the transmission frame generating unit 161 to the transmission packet generating unit 151. The transmission packet generating unit 151 generates a packet by adding a physical header that includes a Preamble, an SFD, a Length, and a Reserved to the payload. On the other hand, the transmission/reception changeover signal generating unit 18 outputs a switch signal to the T/R switch 14 to switch the T/R switch 14 to the transmission side. After receiving the switch signal, the T/R switch 14 switches the coupling destination to the transmission packet generating unit 151 on the transmission side. Furthermore, the transmission/reception changeover signal generating unit 18 performs the operation for switching the coupling destination to the transmission side and also performs the operation for switching the coupling destination to the first antenna 11 or the second antenna 12 by the antenna changeover switch 13. The radio device 10 assumes a configuration in which diversity control of the antenna is not performed at the time of the reception. Therefore, the antenna used for the transmission may be determined in advance. The antenna that is selected at the time of the reception may also be used. By further having the known configuration that is not described in FIG. 2, the radio device 10 may perform the diversity control of the antenna at the time of the transmission.

The radio unit 15 converts the transmission packet into a high frequency signal by a high frequency circuit unit (not illustrated) and outputs the transmission packet into a space through the T/R switch 14, the antenna changeover switch 13, and the first antenna 11 or the second antenna 12.

A reception operation of the radio device will be described below.

In a reception standby state, the radio device 10 outputs, from the transmission/reception changeover signal generating unit 18, the switch signal to switch the T/R switch 14 to the reception side. The transmission/reception changeover signal generating unit 18 outputs the selection diversity control signal of the antenna control signal generating unit 19 so that the selection diversity control for switching the first antenna 11 and the second antenna 12 in certain time intervals. The antenna control signal generating unit 19 receives the selection diversity control signal and outputs the antenna control signal to the antenna changeover switch 13 to switch the first antenna 11 and the second antenna 12 in certain time intervals.

When receiving a packet from another terminal, the radio device 10 demodulates the packet by the high frequency circuit unit (not illustrated) of the radio unit 15. The synchronization detecting unit 153 receives the demodulated packet through the reception band filter 154, detects a synchronous word included in the physical header, removes the payload (PSDU frame) after the detection position, and outputs the demodulated packet to the frame type determining unit 171. For example, the RSSI measuring unit 155 such as a log amplifier or the like receives the packet through the reception band filter 154 and measures the strength of a receiving electric field in the preamble of the packet.

The frame type determining unit 171 reads the header information of the payload output from the synchronization detecting unit 153 of the radio unit 15 to determine whether the frame is a command or data. If the frame type determining unit 171 determines that the frame is a command, the frame type determining unit 171 outputs the frame to the command processing unit 172. If the frame type determining unit 171 determines that the frame is data, the frame type determining unit 171 outputs the frame to the data storage unit 173.

The command processing unit 172 analysis the frame of the command output from the frame type determining unit 171. The command processing unit 172 determines whether or not the command described in the received frame is a preamble length reduction request. If the command is the preamble length reduction request, the command processing unit 172 outputs the frame to the preamble length processor 162.

The preamble length processor 162 detects the contents of the transmission source information and of the preamble length reduction request from the received frame and outputs the control signal indicating the preamble length reduction request to the preamble generating unit 152. After receiving the control signal, the preamble generating unit 152 generates and outputs a reduced preamble and an address indicating a transmission source to the transmission packet generating unit 151. The transmission packet generating unit 151 adds the preamble generated by the preamble generating unit 152 and a transmission source address to the frame signal from the transmission frame generating unit 161 and generates and outputs a transmission packet to the T/R switch 14.

Figure 3A:
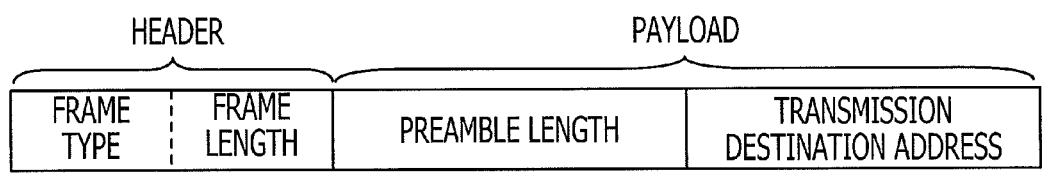
FIGS. 3A and 3B are diagrams illustrating a frame configuration of each stage.
Figure 3B:
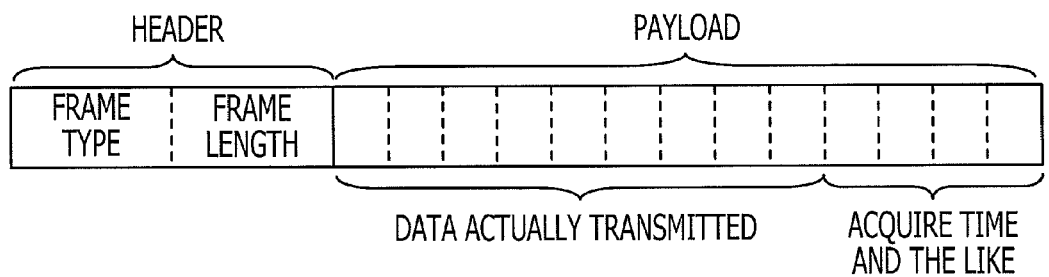

With reference to FIG. 3, a frame configuration of each stage will be described below. FIGS. 3A and 3B are diagrams illustrating details of the frame configuration corresponding to an application layer of the physical frame. For example, the frame in the application layer is a control frame that controls the operation of each radio device, a data frame that transmits actual data such as a temperature. The header of the frame indicates a type of frame and is used to determine the type of frame.

FIG. 3A illustrates the configuration of the control frame indicating a preamble length reduction request. The control frame includes a header with a frame type and a frame length indicating a length of the reduced preamble, and a transmission destination address indicating the transmission destination to which the preamble length reduction request is transmitted.

FIG. 3B is a diagram illustrating the frame configuration (in other words, a data frame) at the time of data transmission/reception. The data frame includes a header with a frame type and a frame length and includes a payload with data that is actually transmitted with information such as a temperature, and an acquire time at which the temperature information is acquired.

There are various types of command in the actual device. In the embodiments, simply the command of the preamble length reduction request is described. The above-described command is included in the frame illustrated in FIG. 3A. The preamble length reduction request frame typically reduces the preamble length of the transmission packet that is to be transmitted to the radio device 10 from the radio devices (the radio devices 20a to 20c or the like) located around the radio device 10, for example.

FIG. 2 will be further described. If the frame output from the synchronization detecting unit 153 is, for example, environmental information such as a temperature or non-command data such as a Hello packet, the frame type determining unit 171 cuts off the data of the application layer from the PSDU of the physical layer of the frame and stores, in the data storage unit 173, the cut data and the data transmission source address information in the PSDU. The data storage unit 173 outputs the transmission source address to the adjacent terminal table 174. The adjacent terminal table 174 tabulates and transmits the transmission source address information as the information of the adjacent radio device. In this case, the adjacent radio devices (for example, the radio devices 20a to 20c described in FIG. 1) are located around the radio device 10 and transmit the packet to the radio device 10.

With reference to FIG. 4, the configuration of the adjacent terminal table 174 will be described below. FIG. 4 is a diagram illustrating an example of a table configuration of the adjacent terminal table 174. The adjacent terminal table 174 employs a configuration in which a group ID, a MAC address, a network address, a device type, or the like are listed. The group ID is an ID number for identification that is used to group the frames according to the network address included in the header of the NWK frame and is allocated to each of the grouped network addresses. The MAC address indicates the MAC address detected from the header of the MAC frame. The network address indicates the NWK header detected from the network frame. The device type is detected from the application header of the application frame. The adjacent terminal table 174 may add other information such as an RSSI, for example, to the list as well as the above-described information.

FIG. 2 will be further described below. For example, the packet density determining unit 176 regularly refers to the adjacent terminal table 174 to obtain the number of terminals (in other words, the number of location) located adjacent to the radio device 10. The packet density determining unit 176 determines the packet density by setting a threshold value for the number of adjacent terminals and comparing the number of adjacent terminals to the threshold value. If the number of adjacent terminals is larger than the threshold value, the packet density determining unit 176 determines that the packet density is relatively high. The packet density determining unit 176 outputs a signal that requests the preamble length reduction to the transmission frame generating unit 161.

When receiving the request signal, the transmission frame generating unit 161 transmits, to the transmission packet generating unit 151, the preamble length reduction request frame that is illustrated in FIG. 3A and includes a header with a frame type and a frame length and includes the preamble length reduction request frame with a payload having a preamble length and a transmission destination address. The transmission packet generating unit 151 adds the preamble generated by the preamble generating unit 152 to the received preamble length reduction request frame and transmits the preamble length reduction request frame through the T/R switch 14, the antenna changeover switch 13, and the first antenna 11 or the second antenna 12.

After outputting the signal that requests the preamble length reduction to the transmission frame generating unit 161, the packet density determining unit 176 outputs a change signal that changes the band to the reception band filter 154. By changing the value registered in a register (not illustrated) according to the change signal of the band, the reception band filter 154 performs setting so that the filter band is changed. For example, after outputting the signal that requests the preamble length reduction request to the transmission frame generating unit 161, the packet density determining unit 176 outputs the change signal that expands the band to the reception band filter 154. The reception band filter 54 expands the filter band by changing the register value according to the change signal.

Figure 5:
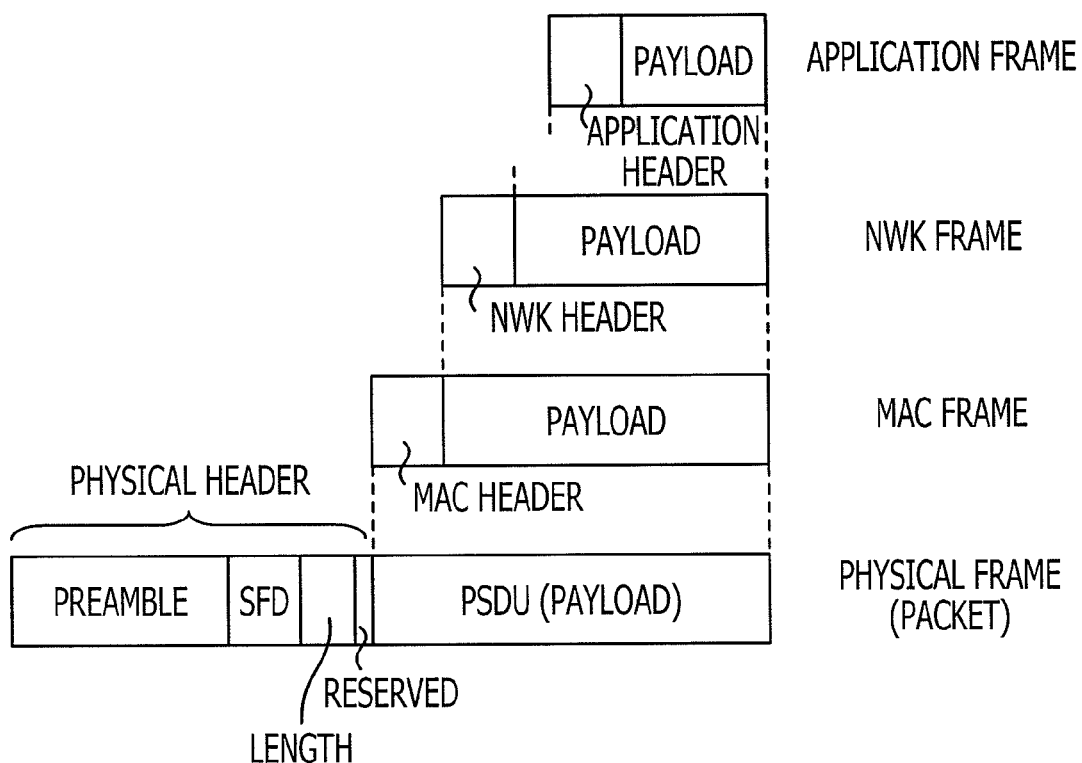
FIG. 5 is a diagram illustrating details of a frame configuration of an application layer.

If the number of adjacent radio devices is smaller than the threshold value and if the preamble length reduction request signal is transmitted before, the packet density determining unit 176 outputs the expansion request signal that expands the preamble length to the preamble length processor 162. The transmission frame generating unit 161 outputs, to the transmission packet generating unit 151, the frame that is illustrated in FIG. 5 and includes the header with the frame type and the frame length and includes the frame with the payload that has the expanded preamble length and the transmission destination address. The transmission packet generating unit 151 adds the preamble generated from the preamble generating unit 152 to the frame from the transmission frame generating unit 161 and transmits the frame through the T/R switch 14, the antenna changeover switch 13, and the first antenna 11 or the second antenna 12.

After outputting the signal for requesting the expansion of the preamble length to the transmission frame generating unit 161, the packet density determining unit 176 outputs the change signal that reduces the band to the reception band filter 154. The reception band filter 154 reduces the filter band by changing the register value according to the change signal.

The RSSI measuring unit 155 measures an RSSI as a signal strength of the reception packet and outputs the RSSI value and antenna information from the antenna control signal generated by the antenna control signal generating unit 19 to the RSSI storage unit 175. That is, in the diversity reception, the radio device 10 switches the coupling destination to the first antenna 11 or the second antenna 12 by the antenna changeover switch 13 in the preamble of the packet head and then receives the radio signal. The RSSI storage unit 175 stores the stored RSSI value and the antenna information (indicating whether the first antenna 11 or the second antenna 12 receives the radio signal).

The RSSI size determining unit 177 compares the size of the RSSI value by the first antenna 11 and the second antenna 12 stored in the RSSI storage unit 175 and determines which antenna to receive the signal after the preamble with. By outputting the determined antenna information to the antenna control signal generating unit 19 and controlling the antenna changeover switch 13, the RSSI size determining unit 177 performs control so that the radio unit 15 receives the signal after the preamble.

The packet transmitted and received by the operation of the radio device 10 may include a frame format, which is used in the radio sensor network, according to known specifications, for example, IEEE 802.15.4d. FIG. 5 is a diagram illustrating a frame configuration of each stage. FIG. 5 schematically illustrates the frame format according to IEEE 802.15.4d specification as in a physical frame an example of packet.

As illustrated in FIG. 5, the packet, that is, the physical frame includes a Preamble, a Smart Frame Delimiter (SFD) as a synchronous word, a Length that stores the frame length, a physical header with Reserved that is reserved on the specification, and a PHY Service Data Unit (PSDU) as a payload storing the data. The MAC frame, which is an upper layer of the physical frame, goes into the payload of the physical frame and includes the MAC header and the payload. The network (NWK) frame, which is a frame in an upper layer of the MAC frame, goes into the payload of the MAC frame and includes the NWK header and the payload. The application frame, which is a frame in an upper layer of the NWK frame, goes into the payload of the NWK frame and includes the application header and the payload.

The preamble includes a prescribed data length set by the specification or the like and does not include substantial data. Hereinafter, the preamble length is assumed to be 8 byte when the packet is transmitted to the radio device 10 from the radio device 20 illustrated in FIG. 1.

The RSSI measuring unit 155 of the radio device 10 measures the RSSI for each of the first antenna 11 and the second antenna 12 while receiving the preamble of 8 byte. Specifically, the RSSI measuring unit 155 measures the RSSI of the first antenna 11 while receiving a prescribed data length in the preamble and measures the RSSI of the second antenna 12 while receiving the following prescribed data length. While receiving the prescribed data length part, the RSSI measuring unit compares the RSSIs of the first antenna 11 and the second antenna 12 and selects the antenna used to receive the data of the PSDU of the packet.

Figure 6:
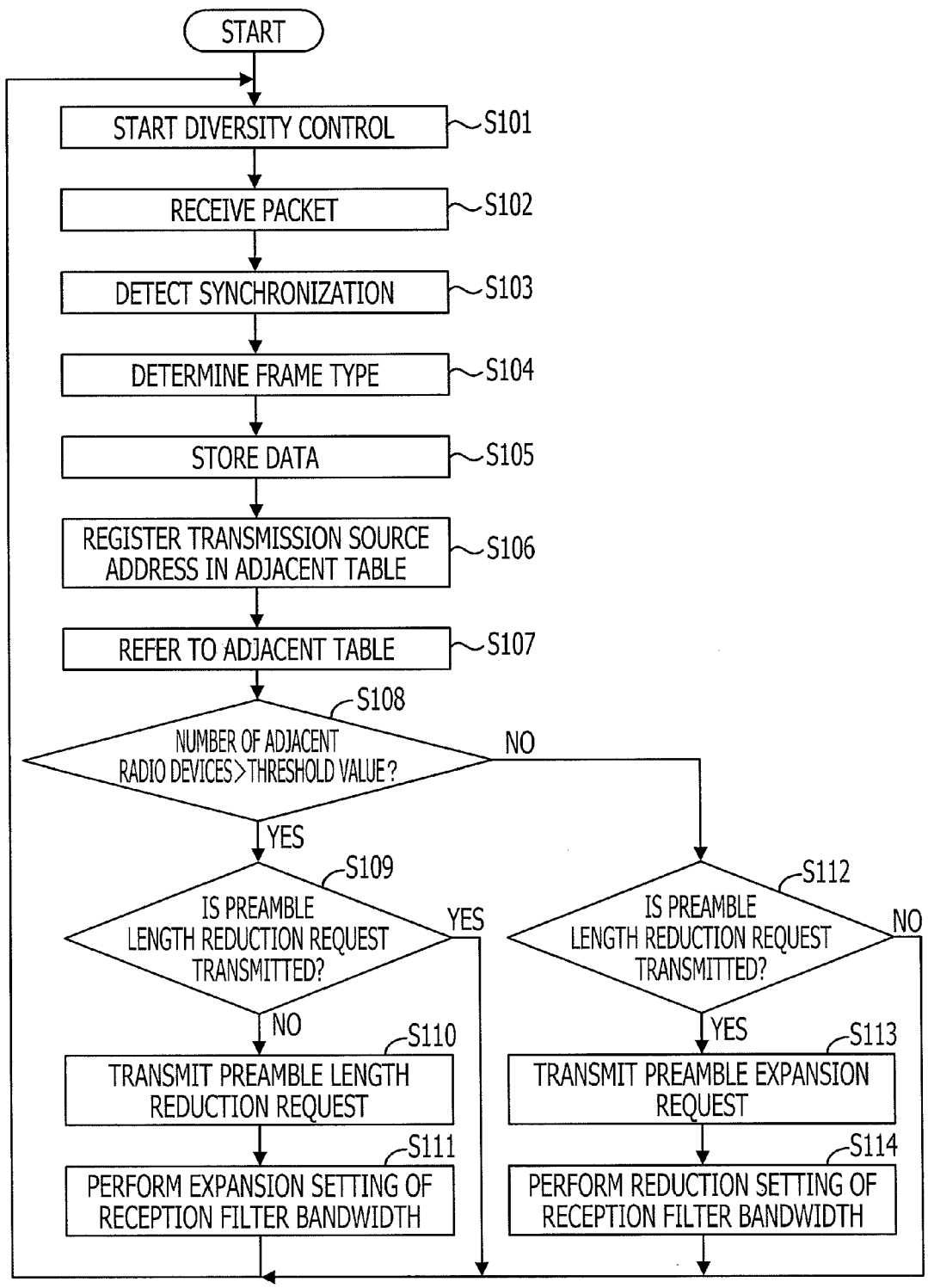
FIG. 6 is a flowchart illustrating a flow of operation of packet reception of the radio device.

Regarding the radio device 10 illustrated in FIG. 2, the operation flow will be described with reference to FIG. 6. FIG. 6 is a flowchart illustrating a flow of the operation of the radio device 10.

According to the transmission/reception operation of the signal, the radio device 10 controls the selection diversity receiving method with respect to the first antenna 11 and the second antenna 12 as the normal operation by the operation of the antenna control signal generating unit 19. The antenna control signal generating unit 19 switches the antenna used for reception by transmitting the antenna control signal to the antenna changeover switch 13 at the time of reception of the signal (Operation S101).

The radio device 10 receives the packet through the first antenna 11, the second antenna 12, and the reception band filter 154 (Operation S102). The synchronization detecting unit 153 detects a synchronous word in the obtained reception packet and outputs the payload after the synchronous word to the frame type determining unit 171 through the reception band filter 154 (Operation S103).

The frame type determining unit 181 detects the header of the application frame illustrated in FIG. 3 from the payload of the synchronization detecting unit 153 and determines whether the payload is a command or data by referring to the information indicating the frame type included in the header (Operation S104).

If the payload is determined to be a command, the frame type determining unit 171 outputs the payload to the command processing unit 172. If the payload is determined to be data, the frame type determining unit 171 stores the payload in the data storage unit 173 (Operation S105).

The data storage unit 173 registers the transmission source address of the packet in the adjacent terminal table 174 based on the information included in the payload (Operation S106). The packet density determining unit 176 refers to the number of the transmission source addresses registered in the adjacent terminal table 174 (Operation S107). The number of terminals that transmit the packet to the radio device 10 may be calculated from the number of transmission source addresses.

The packet density determining unit 176 obtains the number of adjacent radio devices from the table of the adjacent terminal table 174 and compares the number to a prescribed value (Operation S108). If the number of adjacent radio devices is larger than the threshold value (Yes in Operation S108), the process goes to Operation S109. If the number of adjacent radio devices is not larger than the threshold value (No in Operation S108), the process goes to Operation S113.

If the number of adjacent radio devices is larger than the threshold value (Yes in Operation S108), the packet density determining unit 176 checks if the preamble length reduction request is transmitted before (Operation S109). If the preamble length reduction request is not transmitted (No in Operation S109), the process goes to Operation S110. If the preamble length reduction request is transmitted (Yes in Operation S109), the process goes back to Operation S101.

If the preamble length reduction request is not transmitted before (No in Operation S109), the packet density determining unit 176 outputs the request signal for reducing the preamble length to the transmission frame generating unit 161. In response to the request signal, the transmission frame generating unit 161 outputs, to the transmission packet generating unit 151, the frame with the payload that includes the header with the frame type and the frame length and includes the payload with the preamble length and the transmission destination address as illustrated in FIG. 3A. The transmission packet generating unit 151 adds the preamble from the preamble generating unit 152 to the frame from the transmission frame generating unit 161 and transmits the frame through the T/R switch 14, the antenna changeover switch 13, and the first antenna 11 or the second antenna 12 (Operation S110).

After outputting the request signal that reduces the preamble length to the transmission frame generating unit 161, the packet density determining unit 176 outputs the change signal that changes the band to the reception band filter 154. When receiving the expansion change signal, the reception band filter 154 changes the register value to change the band and expand the filter band, and the process goes back to Operation S101 (Operation S111).

The packet density determining unit 176 checks if the preamble length reduction request is transmitted before (Operation S112). If the preamble length reduction request is transmitted before (Yes in Operation S112), the process goes to Operation 5114. If the preamble length reduction request is not transmitted before (No in Operation S112), the process goes back to Operation S101.

If the preamble length reduction request is transmitted before (Yes in Operation S112), the packet density determining unit 176 outputs the control signal indicating the expansion request that expands the preamble length to the preamble length processor 162. The transmission frame generating unit 161 outputs, to the transmission packet generating unit 151, the header with the frame type and the frame length illustrated in FIG. 5 and the frame with the payload that includes the expanded preamble length and the transmission destination address. The transmission packet generating unit 151 adds the preamble from the preamble generating unit 152 to the frame from the transmission frame generating unit 161 and transmits the frame through the T/R switch, the antenna changeover switch 13, and the first antenna 11 or the second antenna 12 (Operation S113).

After outputting the control signal indicating the preamble length expansion request to the preamble length processor 162, the packet density determining unit 176 outputs the reduction change signal that reduces the band to the reception band filter 154. When receiving the reduction change signal, the reception band filter 154 changes the register value to reduce the band so that the filter band is reduced. The process goes back to Operation 5101 (Operation S114).

The radio device 10 obtains the number of radio devices 20 located around the radio device 10 at the time of transmission/reception operation of the signal (Operation S103). For example, this is performed by referring to the database or the like that stores the location state of the radio device 20 in the memory. At this time, it is preferable that the radio device 10 obtains the number of adjacent devices and performs packet exchanging of a Hello packet or the like among the radio devices 20a to 20c, the number of the adjacent devices is obtained, and the adjacent terminal table 174 is updated.

If the obtained number of adjacent radio devices is larger than a prescribed threshold value (Yes in Operation S104), the radio device 10 transmits the preamble length reduction request that reduces the preamble length of the transmission packet to the radio devices 20 located around the radio device 10. To transmit the preamble length reduction request to all the radio devices 20 transmit/receive the packet to/from the radio device 10, the radio device 10 may transmit the preamble length reduction request by a broadcast transmitting method.

With reference to FIG. 7, a time series relation of a mode of broadcast transmission of the preamble length reduction request after the packet collision due to the packet transmission and the packet transmission from each of the radio devices 20. FIG. 7 is a diagram illustrating a time series mode of packet transmission/reception in a case where the radio devices 20a to 20c perform the packet transmission/reception by the CSMA/CA method.

In FIG. 7, if the radio devices 20a to 20c located around the radio device 10 randomly transmit the packets to the radio device 10, the packet from the radio device 20b collides with the packet from the radio device 20c received by the radio device 10. After that, the radio device 10 broadcast-transmits the preamble length reduction request to the radio devices 20a to 20c. According to the broadcast transmission, as illustrated in FIG. 7, the signal is transmitted to a plurality of transmission destinations concurrently. Due to this, each of the radio devices 20a to 20c receives the preamble length reduction request at the substantially same time.

The broad cast packet transmitted as the preamble length transmission request includes the information indicating the address of the radio device 10 and the preamble length of a case where the packet is transmitted to the radio device 10. The radio device 20 that receives the information recognizes the packet as the preamble length transmission request. After this, to transmit the signal to the radio device 10, the radio device 20 sets the preamble length of the packet to the preamble length stored in the broadcast packet. As described above, in the communication network in which the preamble length is usually set to 8 byte, for example, the reduced preamble length is set to 4 byte. The broadcast transmission is an example of form of transmission. The radio device 10 may transmit the preamble length reduction request to all the radio devices 20 as the transmission destination. Furthermore, the radio device 10 may transmit the preamble length reduction request quickly by any form of transmission.

After receiving the preamble length reduction request, to transmit the packet to the radio device 10, the radio devices 20a to 20c transmit a packet with a length that is shorter than the packet before the preamble length set according to the reduction request is added to the packet.

If the preamble length of the packet transmitted by the radio device 20 to the radio device 10 is short, the length of each packet received by the radio device 10 is short. As illustrated in FIG. 7, since the occupancy ratio of each packet in the space is reduced, the radio device 10 may receive more packets compared to the packets before the preamble length is reduced.

The radio device 10 transmits the preamble length reduction request to the radio device 20 and sets a band of the reception band filter 154 that is wider than the specified value so that the diversity control for selecting a proper antenna for reception even though the preamble length is short. For example, if the bandwidth of the reception band filter 154 is 150 kHz, the bandwidth is changed to 200 kHz.

According to the reduction of the preamble length instructed by the previous preamble length reduction request, the filter band processor 164 (not illustrated) may determine expansion of the band of the reception band filter 154. As described below, during the reception time of the preamble that is reduced by the reduction request, the RSSI is properly measured with respect to each of the first antenna 11 and the second antenna 12, the expansion of the reception band filter 154 may be set if the antenna suitable for reception may be selected.

Figures 8A, 8B:
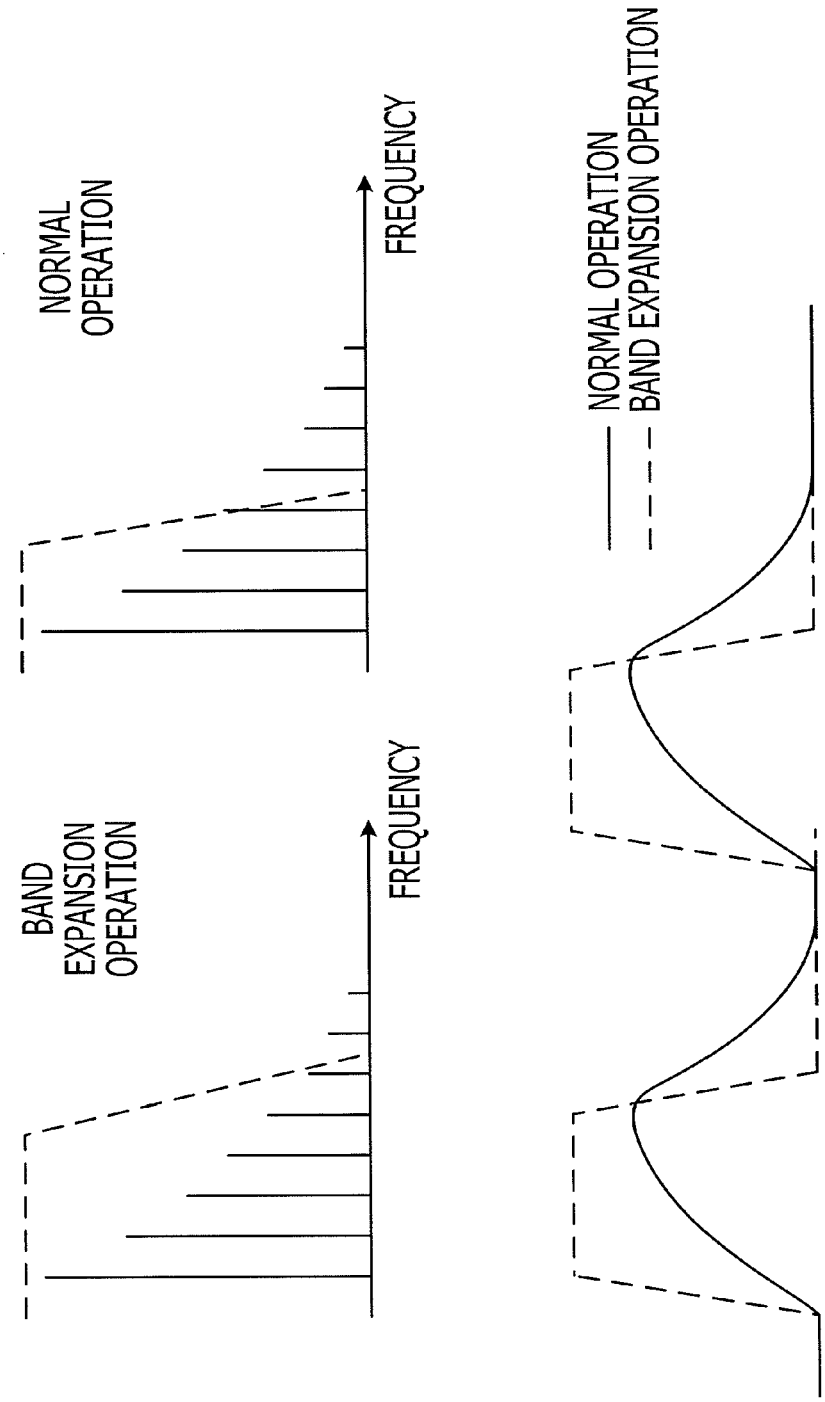
FIGS. 8A and 8B are diagrams illustrating a relation between a bandwidth of a reception band filter of the radio device and an output waveform through the reception band filter.

Before the frequency band of the reception band filter in the radio device 10 is changed, by changing the packet length transmitted from the radio device, the packet collision may be surely avoided after the packet length change is instructed. With reference to FIGS. 8 and 9, the influence on the operation of the radio device 10 in a case where the band of the reception band filter is changed will be described below. With reference to FIGS. 8 and 9, the influence on the operation of the radio device 10 in a case where the band of the reception band filter is changed will be described below. Regarding the band of the reception signal measured by the RSSI measuring unit 155 of the radio device 10, FIG. 8A is a diagram illustrating both the normal operation (the lower part), in which expanding setting of a prescribed value is not performed on the reception band filter bandwidth by the processing of Operation S111 in FIG. 6, and the band expansion operation (the upper part), in which the expanding setting of the prescribed value is performed. In FIG. 8A, the transverse axis indicates the frequency of the reception signal measured by the RSSI measuring unit 155. FIG. 8B plots the output of the measured reception signal in the vertical axis and indicates the time in the transverse axis. FIG. 8 illustrates the reply time difference of the output of the measured reception signal between the normal operation and the band expansion operation of the passband of the reception band filter 154.

As illustrated in FIG. 8A, in the band expansion operation of the reception band filter 154, the RSSI measuring unit 155 may measure a signal with a wider frequency compared to the normal operation. Therefore, as illustrated in FIG. 8B, regarding the output of the reception signal measured by the RSSI measuring unit 155, the reply performance is improved, and the pulse shape is clear in the band expansion operation. On the other hand, when the passband is in the normal operation, the measured reply time of the output is slower than the band expansion time, and the pulse shape is collapsed and then formed in a triangular shape. As a result, the pulse shape is difficult to be measured.

The time until the RSSI of the signal is measured from the signal reception may be separated into an Auto Gain Control (AGC) setting time and a RSSI stable. To output the stable RSSI, the AGC is desired to be adjusted several times. The AGC circuit (not illustrated) adjusts the signal amplitude and desires a setting time that is called an ACG setting time in which the adjustment is completed.

Figure 9A:
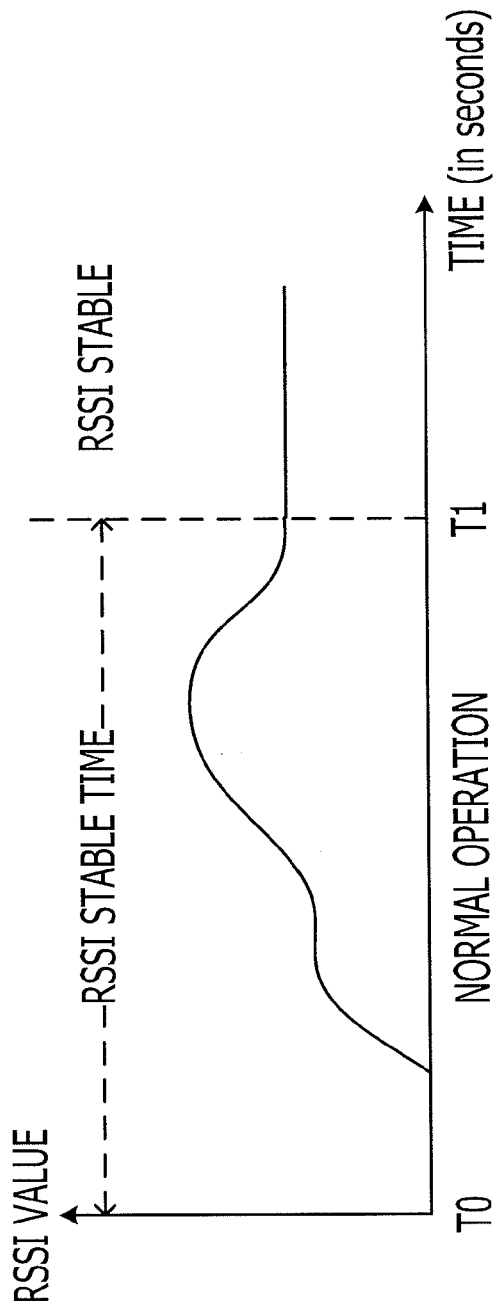
FIGS. 9A and 9B are diagrams illustrating a relation between the bandwidth of the reception band filter and a time until RSSI is stable.
Figure 9B:
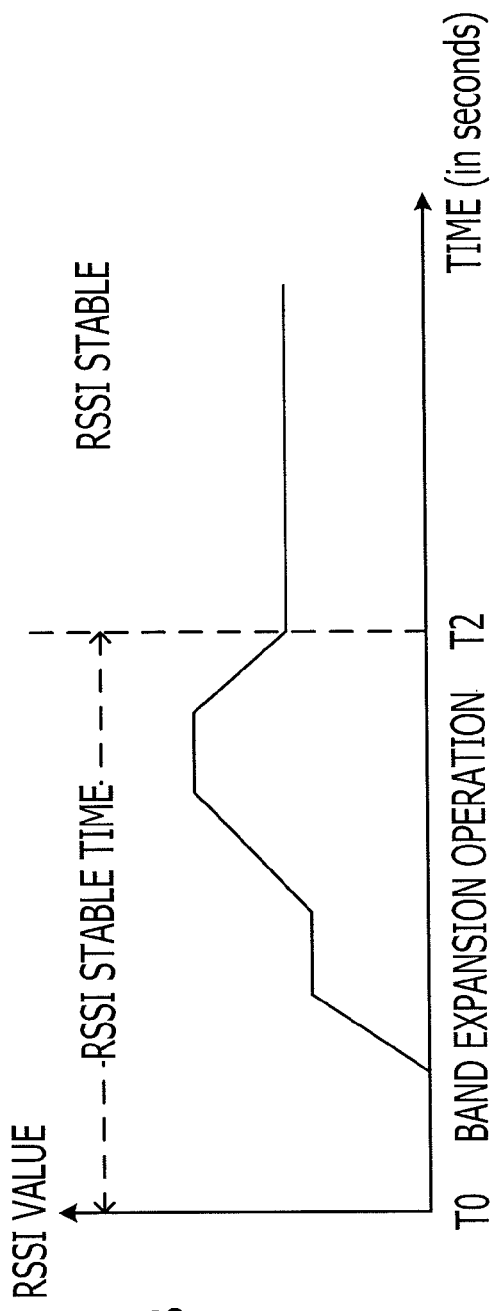

In the example illustrated in FIG. 9A of the normal operation in which the passband of the reception band filter 154 is relatively narrow, the time from the signal reception (Time T0) to the RSSI stable (Time T1) is the AGC setting time. In other words, if the RSSI stable time is not secured in the preamble reception term of the packet, the RSSI is not properly measured, so that the antenna used for reception may not be properly selected.

In other words, in the passband expansion operation of the reception band filter 154, since the reply of an output waveform is higher than in the normal operation, the desired time for feedback control is shorter than in the normal operation. In the example illustrated in FIG. 9B, the signal received at a time (Time T0) equivalent to the normal time may reach the RSSI stable at a time T2 earlier than a time T1. Therefore, the reply in the AGC adjustment operation may be shortened if the bandwidth of the reception band filter is set to be wide. As a result, the RSSI reply speed may be set to be faster, and the antenna changeover switch time may be set to be shortened. Therefore, even for the preamble reduction, the proper measurement of the RSSI may be performed, and the proper antenna selection may be performed by the diversity control.

The passband of the reception band filter 154 of the radio device 10 is set be narrow enough so that the signal-to-noise ratio is not lost at the time of initial setting. If the passband is set to be wide, other signals of the frequency band adjacent to the original passband pass through the passband and the signals are input as noise. As a result, the communicable distance of the radio device 10 is reduced.

However, the radio device 10 may be located in a situation where the number of adjacent radio devices 20 is large so that the packet occupancy rate in the space may be determined to be efficiently high. As described above, if the radio devices 10 and 20 are located close to each other, the distance from the radio device 20 to the radio device 10 may be determined to be relatively short. Therefore, according to the determination, the reduction of communicable distance by a noise wave due to the expansion of the passband of the reception band filter 154 is not a problem in the operation of the radio device 10. In the area where the radio devices 10 and 20 are located close to each other, rather than the signal reduction due to a long communication distance, the reduction of the reception power of the signal by a multipath is a big technical problem for reception. The reduction of the reception power of the signal through the multipath may be prevented by the selection diversity method for selecting an antenna that is more suitable for the reception. Thus, the radio device 10 may perform the preferable communication.

The above-described preamble length expansion request is a request for setting to put back the preamble length reduced by the preamble length reduction request to the preamble length that is not yet reduced, that is, the preamble length in the normal operation. If the packet occupancy rate in the space is determined to be low, the signal reception efficiency may not be improved when the radio device 10 reduces the preamble length and then expands the pass frequency band. If the packet occupancy rate in the space is determined to be low, the radio device 10 transmits, to the radio device 20 located around the radio device 10, the preamble length expansion request for putting back the reduced preamble length to the preamble length that is not yet reduced. Thus, the radio device 10 performs the setting for putting the pass frequency band of the reception band to the pass frequency band that is not yet expanded.

According to the radio device 10, it is preferable that the reduced preamble length that is to be set has the lowest limit of the data length that may achieve at least the effect by the diversity control in the radio device 10. The measurement time of the RSSI value of each antenna measured by the RSSI measuring unit 155 of the radio device 10 depends on the RSSI stable time in which the RSSI value is stable from the measurement start of the RSSI value for each antenna until an accurate RSSI value is measurable. The length of the RSSI stable time gets longer if the RSSI measuring unit 155 refers to more frequency bands. The pass frequency band of the reception band filter 154 may be set in the range that is set for each device.

Therefore, for example, it is preferable that when the expanded pass frequency band is set to be wide, the lower limit of the reduced preamble length is the value corresponding to the multiple number of the number of antennas of the radio device 10, so that the RSSI stable time becomes shortest in the setting.

It is preferable that the expanded pass frequency band is set by the trade-off relation between the noise gain from the increase of the noise power due to the expansion of the pass frequency band and the gain obtained by the antenna diversity control. For example, the pass frequency band in which the noise gain is equivalent to the antenna diversity gain is the upper limit.

According to the operation of the radio device 10, the embodiment is not limited to a device having a frame format according to the IEEE802.15.4d specification. A radio device that employs a communication protocol transmitting/receiving the packet having a frame format that may change the preamble length is applicable.

In the operation flow of the radio device 10 illustrated in FIG. 6, the packet density is determined based on the number of radio devices 20 located around the radio device 10. As described above, however, the packet density may be determined based on elements such as the RSSI value of the signal transmitted from the radio device 10, the number of signal retransmission in the radio device 10, or the like.

(3) Embodiment of Radio Communication System

Figure 10:
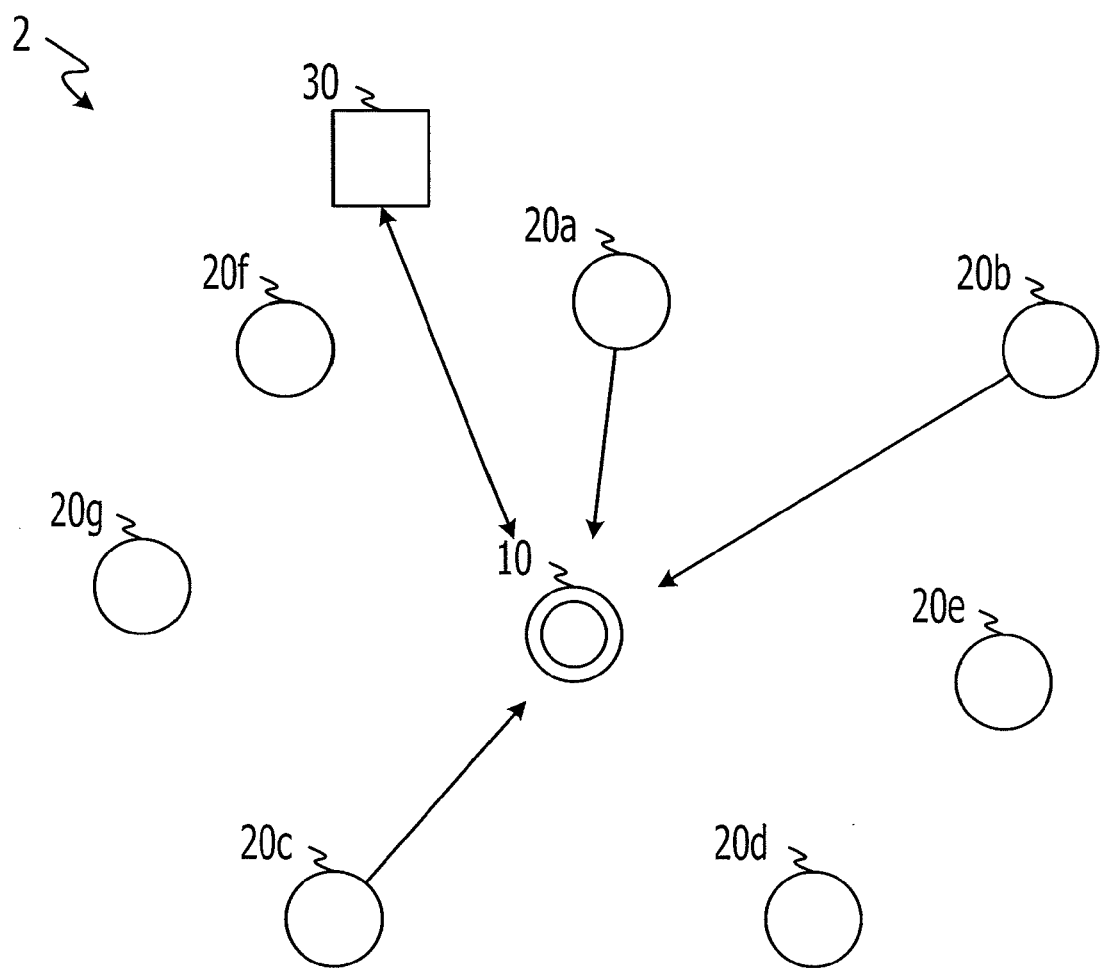
FIG. 10 is a diagram illustrating an overview of a radio communication network that includes a coordinator device for control.

With reference to FIG. 10, a configuration example of a radio communication system 2 that includes the disclosed radio device and management device will be described. The radio communication network 2 illustrated in FIG. 10 includes a plurality of radio devices is radio-communicable with each other. In FIG. 10, the configuration equivalent to FIG. 1 is indicated by the similar number, so that the description is omitted.

As illustrated in FIG. 10, the radio communication network 2 includes a coordinator 30 that manages the operation of the radio devices 10 and 20 as an upper node on the network of the radio devices 10 and 20. The coordinator 30 is an example of the disclosed management device and manages a network such as a regular sensor network. At least one coordinator 30 is located as a radio device in each network. In a preferred embodiment, the coordinator 30 is coupled to each of the radio device 10 and the radio device 20. The coordinator 30 is an access point, a gateway, or the like that controls the transmission/reception of data between the radio devices 10 and 20, and an upper core network. Furthermore, the coordinator 30 may collect environment information such as a temperature and a humidity collected by the radio devices 10 and 20 in the radio communication network 2. Hereinafter, the radio device 10 or the radio device 20 belonging to the radio communication network 2 as a management target of the coordinator 30 are referred to the radio device 10 or the radio device 20 under the coordinator 30 for convenience sake.

Figure 11:
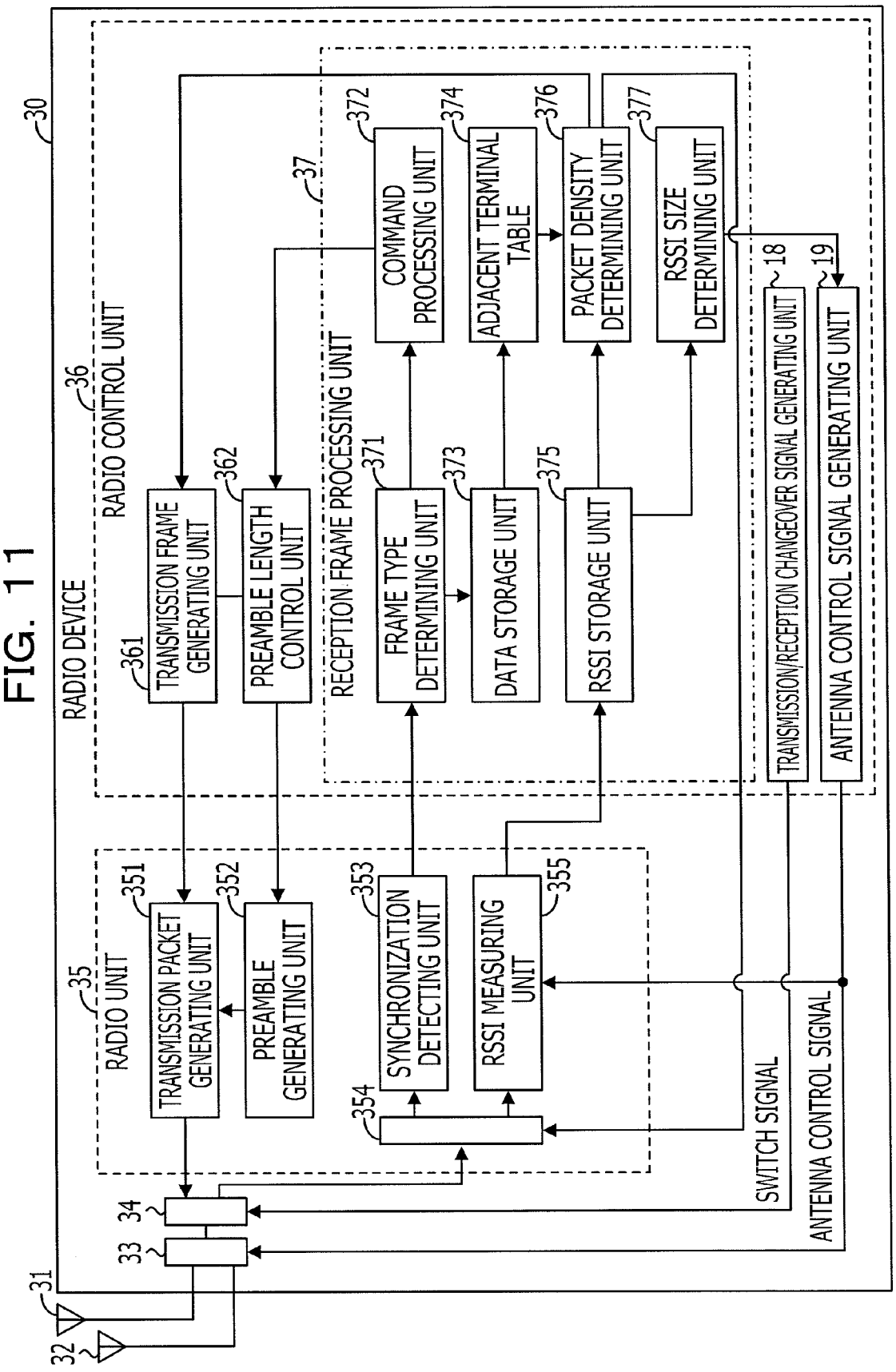
FIG. 11 is a diagram illustrating a deformation configuration example of the radio device.

FIG. 11 illustrates the hardware configuration of the coordinator 30 and the expediential function units of the functions included in the configurations. The coordinator 30 may include hardware and function units equivalent to the radio device 10. That is, in addition to or separately from the hardware configuration and the functions for the above-described network management, the coordinator 30 may include the hardware and the functions equivalent to the radio device 10 illustrated in FIG. 2. The configuration of the coordinator 30 to perform the network management may be known, for example. The description is omitted because the description is barely related to the following description.

As illustrated in FIG. 11, the coordinator 30 includes a first antenna 31, a second antenna 32, an antenna changeover switch 33, a T/R switch 34, a radio unit 35, and a radio control unit 36. The radio unit 35 includes a transmission packet generating unit 351, a preamble generating unit 352, a synchronization detecting unit 353, a reception band filter 354, and a RSSI measuring unit 355. The radio control unit 36 includes a transmission frame generating unit 361, a preamble length processor 362, a reception frame processing unit 37, a transmission/reception changeover signal generating unit 38, and an antenna control signal generating unit 39. The reception frame processing unit 37 includes a frame type determining unit 371, a command processing unit 372, a data storage unit 373, an adjacent terminal table 374, an RSSI storage unit 375, a packet density determining unit 376, and an RSSI size determining unit 377. The specific configurations and functions of the units may be equivalent to the units of the radio device 10.

Figure 12:
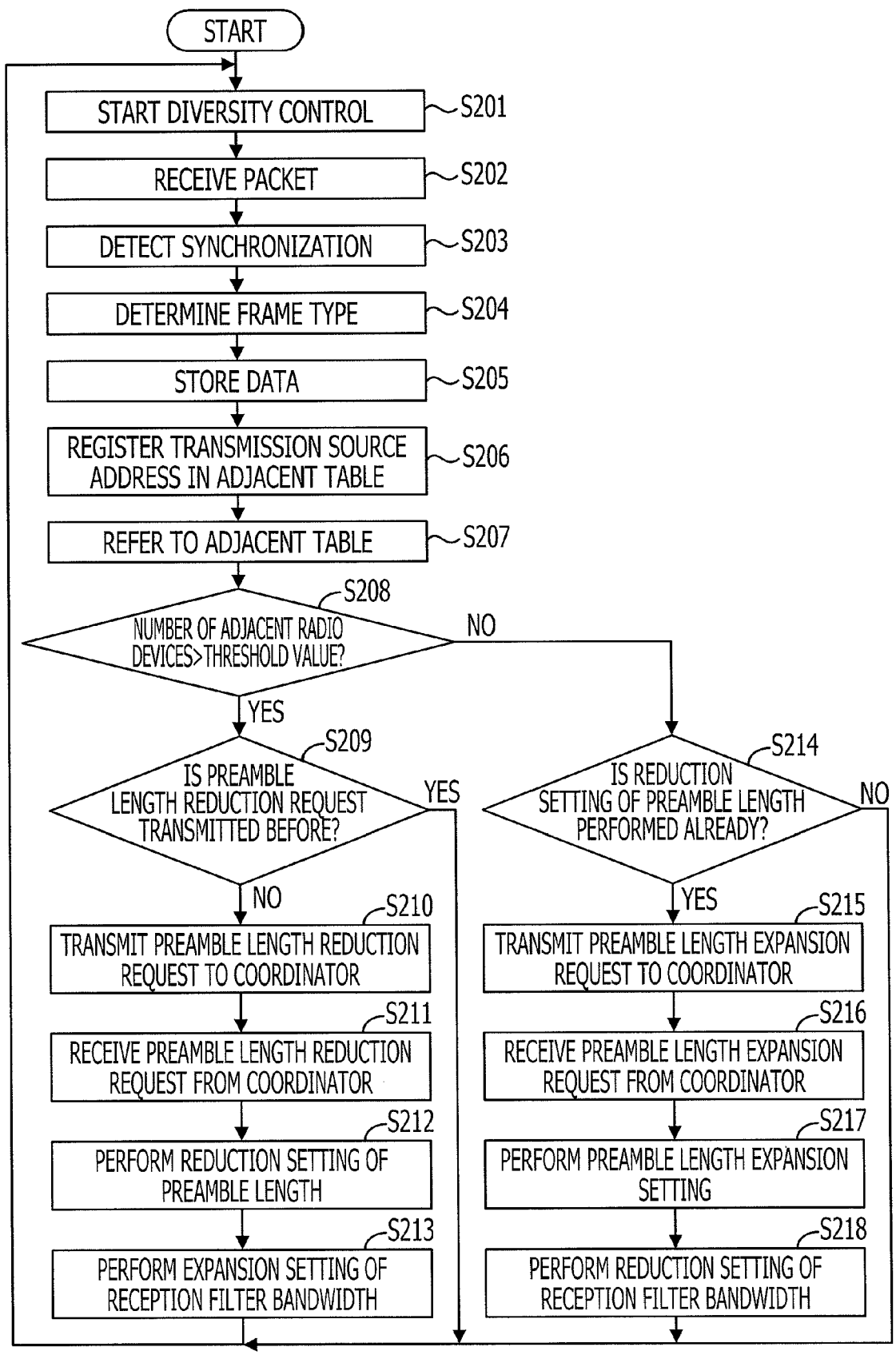
FIG. 12 is a flowchart illustrating a flow of operation of the packet reception of the radio device.
Figure 13:
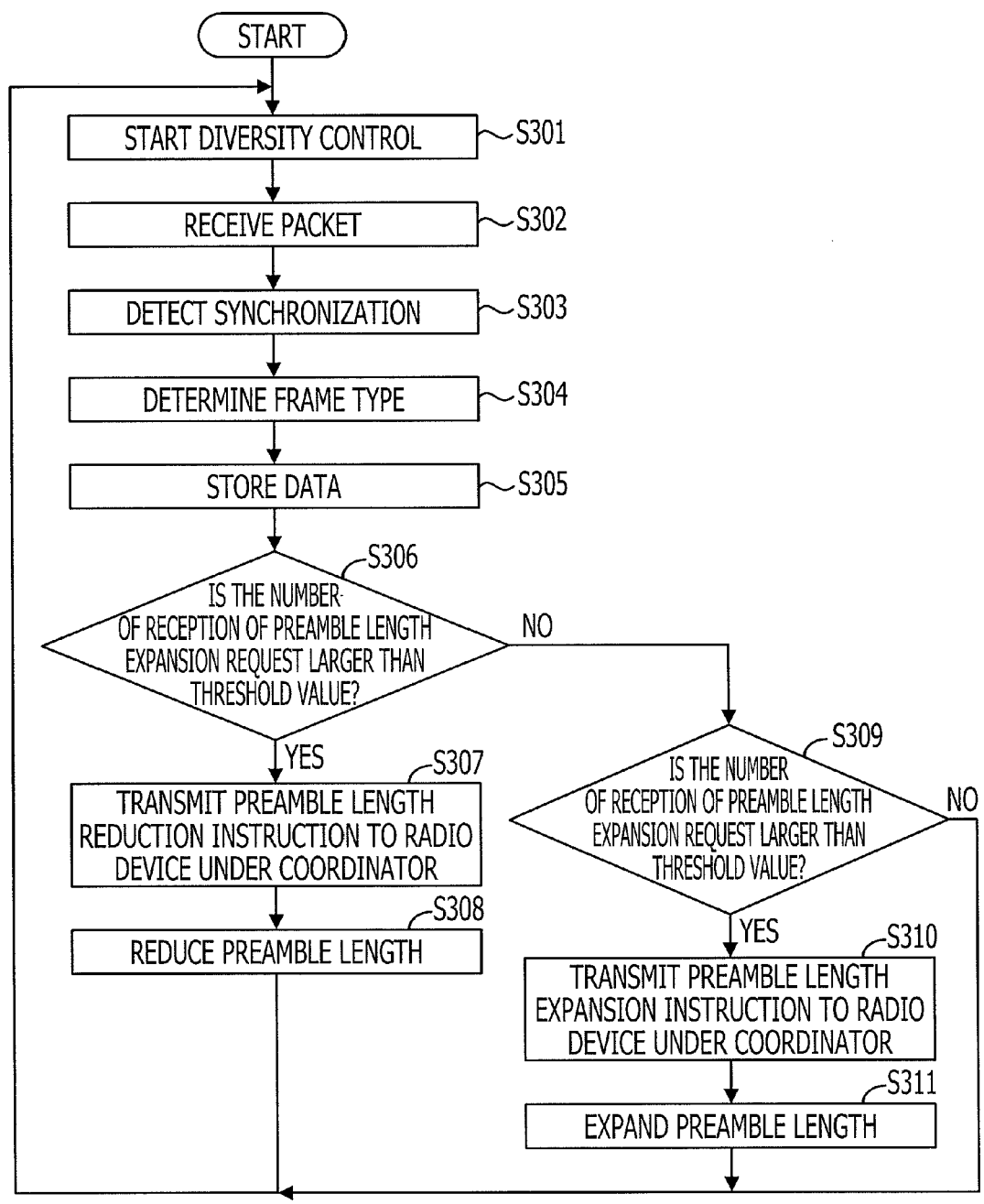
FIG. 13 is a flowchart illustrating a flow of an operation of a coordinator.

With reference to FIGS. 12 and 13, the operation flow of the radio device 10 and the coordinator 30 in the radio communication network 2 will be described. FIG. 12 is a flowchart illustrating the operation flow of the radio device 10 in the radio communication network 2. FIG. 13 is a flowchart illustrating the operation flow of the coordinator 30 in the radio communication network 2.

In the above-described radio communication network 1, the radio device 10 obtains the number of radio devices 20 located around the radio device 10 and transmits the preamble length reduction request if the number of radio devices 20 located around the radio device 10 is larger than a threshold value. In the radio communication network 2, however, if the number of radio devices 20 located around the radio device 10 is larger than the threshold value, the radio device 10 transmits the preamble length reduction request once to the coordinator 30. The specific operation flow of the radio device 10 will be described below.

In the transmission/reception operation of the signal, the radio device 10 performs the control of the selective diversity receiving method with respect to the first antenna 11 and the second antenna 12 as a normal operation (Operation S201).

The radio device 10 receives the packet through the first antenna 11, the second antenna 12, and the reception band filter 154 (Operation S202). The synchronization detecting unit 153 detects the synchronous word in the obtained reception packet through the reception band filter 154 and outputs the payload after the synchronous word to the frame type determining unit 171 (Operation S203).

The frame type determining unit 171 detects the header of the application frame illustrated in FIG. 3 from the payload from the synchronization detecting unit 153, refers to the information indicating the frame type included in the header, and determines whether the payload is a command or data (Operation S204).

If the payload is a command, the frame type determining unit 171 outputs the payload to the command processing unit 172, and if the payload is data, the frame type determining unit 171 outputs the payload to the data storage unit 173 (Operation S205).

The data storage unit 173 registers the transmission source address of the packet in the adjacent terminal table 174 based on the information included in the payload (Operation S206). The packet density determining unit 176 regularly refers to the number of transmission source addresses registered in the adjacent terminal table 174 (Operation S207).

The packet density determining unit 176 obtains the number of adjacent radio devices from the adjacent terminal table 174 and compares the number to the threshold value (Operation S208). If the number of adjacent radio devices is larger than the threshold value (Yes in Operation S208), the process goes to Operation 5209. If the number of adjacent radio devices is not larger than the threshold value (No in Operation S208), the process goes to Operation S213 (Operation S208).

If the obtained number of adjacent radio devices 20 is larger than the threshold value (Yes in Operation S208), the packet density determining unit 176 of the radio device 10 checks if the preamble length reduction request is transmitted before (Operation S209). If the preamble length reduction request is not transmitted before, the process goes to Operation S210. If the preamble length reduction request is transmitted before, the process goes back to Operation S201.

If the preamble length reduction request is not transmitted before (No in Operation S209), the packet density determining unit 176 outputs the request signal that reduces the preamble length to the transmission frame generating unit 161. The transmission frame generating unit 161 outputs the frame based on the request signal to the transmission packet generating unit 151. The transmission packet generating unit 151 that receives the frame adds the preamble from the preamble generating unit 152 to the frame and transmits the frame to the coordinator 30 (Operation S210).

As described below, if the number of reception of the preamble length reduction request from the radio device 10 is larger than the prescribed threshold value, the coordinator 30 transmits the preamble length reduction instruction to the radio device 10 and the radio device 20, which communicates with the radio device 10. At this time, the preamble length reduction instruction indicates both the reduced preamble length and the transmission source that reduces the preamble length of the transmission data.

Since the coordinator 30 transmits the preamble length reduction instruction to the entire of the radio devices 10 and 20 under the coordinator 30 in a mode such as unicast transmission, broadcast transmission, or the like, the radio device 10 may receive the instruction that reduces the preamble length at time of the signal transmission to another radio device 20 (Operation S211). To transmit the signal to the transmission destination specified by the instruction, after receiving the preamble length reduction instruction, the radio device 10 performs the setting for reduction the preamble length to be added to the packet so that to the specified data length (Operation S212). The radio device 10 sets a wide band of the reception band filter 154 under the control of the filter band processor 164 (Operation S213). The radio device 10 continues to transmit and receive the signal.

On the other hand, if the number of radio devices 20 located around the radio device 10 is lower than the threshold value (No in Operation S208), the packet density determining unit 17 determines that the packet density around the radio device 10 is not high. At this time, the radio device 10 already receives the preamble length reduction instruction transmitted from the coordinator 30 and determines whether the preamble length reduction setting at the time of the reception is already performed in response to the instruction (Operation S214). If the preamble length reducing setting is already performed (Yes in Operation S214), the radio device 10 transmits the preamble length expansion request that expands the preamble length to the coordinator 30 (Operation S215). For example, the preamble length expansion request expands the preamble length from the data length reduced according to the preamble length reduction instruction to the reduced data length (in other words, in the normal communication operation).

As described below, according to the preamble length expansion request received from the radio device 10, the coordinator 30 transmits the preamble length instruction to the radio device 10 and the radio device 20 under the coordinator 30. At this time, the preamble length expansion instruction indicates both the expanded preamble length and the transmission destination in which the preamble length of the transmission data is expanded.

To transmit the signal to the transmission destination instructed by the instruction, after receiving the preamble length expansion instruction (Operation S216), the radio device 10 performs setting for expanding the preamble added to the packet to the instructed data length (Operation S217). Furthermore, the radio device 10 performs the setting for reducing the band of the reception band filter 154 under the control of the filter band processor 164 (Operation S218). The radio device 10 continues to transmit and receive the signal.

On the other hand, if the number of radio devices 20 located around the radio device 10 is equal to or smaller than the prescribed threshold value (No in Operation S204) and if the preamble length reduction setting is not performed (No in Operation S20), the radio device 10 does not add a change to the band of the reception band filter or the like and continues transmitting/receiving the signal (Operation S214).

With reference to FIG. 13, the operation of the coordinator 30 that receives the preamble length reduction request and the like in the radio communication network 2 will be described.

As illustrated in FIG. 13, the coordinator 30 performs control of the selection diversity receiving method on the first antenna 31 and the second antenna 32 as a normal operation according to the operation of the antenna control signal generating unit 39 (Operation S301).

The coordinator 30 receives the packet through the first antenna 31, the second antenna 32, and the reception band filter 354 (Operation S302). The synchronization detecting unit 353 detects a synchronous word in the obtained reception packet and outputs the payload after the synchronous word to the frame type determining unit 371 through the reception band filter 354 (Operation S303).

The frame type determining unit 371 determines whether the payload from the synchronization detecting unit 353 is a command or data (Operation S204).

If the payload is a command, the frame type determining unit 371 outputs the command to the command processing unit 372, and if the payload is data, the frame type determining unit 371 outputs the data to the data storage unit 373 (Operation S305).

The coordinator 30 counts the number of preamble length reduction requests or preamble length expansion requests transmitted from the radio devices 10 and 20 under the coordinator 30. The coordinator 30 sets a threshold value to the number of reception of the preamble length reduction request and of the preamble length expansion request, respectively.

If the number of reception of the preamble length reduction request is larger than the threshold value (Yes in Operation S306), the coordinator 30 transmits the preamble length reduction instruction to the radio devices 10 and 20 under the coordinator 30 (Operation S307). After receiving the preamble length reduction instruction, the radio devices 10 and 20 under the coordinator 30 performs setting for reducing the preamble length in each transmission as described above. The coordinator 30 performs the setting for reducing the preamble to transmit the signal to the radio devices 10 and 20 under the coordinator 30 (Operation S308).

On the other hand, if the number of reception of the preamble length expansion request is larger than the threshold value (No in Operation S306 and Yes in Operation S309), the coordinator 30 transmits the preamble length expansion instruction to the radio devices 10 and 20 under the coordinator 30 (Operation S310).

After receiving the preamble length expansion instruction, the radio devices 10 and 20 under the coordinator 30 perform setting for expanding the preamble length in each transmission as described above. The coordinator 30 performs the setting for expanding the preamble length in a case of transmitting the signal to the radio devices 10 and 20 under the coordinator 30 (Operation S311). The instruction may be transmitted to the radio devices 10 and 20 under the coordinator 30 by the unicast transmission or the broadcast transmission. Any transmission mode is applicable if the instruction may be preferably transmitted to the radio devices 10 and 20 under the coordinator 30.

By transmitting the instruction for collectively changing the preamble lengths to the radio devices 10 and 20 under the coordinator 30, the radio devices 10 and 20 under the coordinator 30 may be subjected to the control for changing the preamble length concurrently. This may eliminate the state where the preamble length varies according to each radio device in a certain time if the request for directly changing the preamble length is transmitted to and from the radio devices.

In the examples with reference to FIGS. 12 and 13, the coordinator 30 determines the packet density in the radio communication network 2 based on the number of the preamble length reduction requests or the preamble length expansion requests transmitted from the radio devices 10 and 20 under the coordinator 30. In another preferred embodiment, the radio device 10 may transmit the obtained number of radio devices 20 located around the radio device 10 to the coordinator 30. At this time, the coordinator 30 sets the threshold value to the number of adjacent radio devices, counts the reports of which the number of adjacent radio devices is larger than the threshold value, and determines the packet density in the radio communication network 2 according to the count number.

The coordinator 30 receives the preamble length reduction request or the report of the number of adjacent radio devices from the plurality of radio devices and may determine the packet density around the plurality of radio devices based on the received content. When the preamble length reduction request is transmitted from the plurality of radio devices or when the number of adjacent radio devices that is larger than the threshold value is reported from the plurality of radio devices, the increase of the packet density in the area in which the plurality of adjacent radio devices may be determined with high accuracy. Therefore, the packet density may be determined more accurately compared to the case of determining the packet density according to the preamble length reduction request or the like from one radio device.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A radio device comprising:
a plurality of antennas transmitting and receiving a signal to and from another radio device;
a reception band filter which controls a pass frequency band;
a measuring circuit which measures a reception level of the signal received by each of the plurality of antennas in a preamble in the signal received through the reception band filter;
an antenna switch which switches the plurality of antennas based on a measurement result from the measuring circuit; and
a processor which controls transmission and reception of the signal of the radio device and the pass frequency band of the reception band filter, and which transmits, based on a packet density, an instruction for changing the preamble from a first data length to a second data length to the other radio device and for changing the pass frequency band of the reception band filter from a first band to a second band,
wherein if the packet density is determined to be higher than a prescribed threshold, the processor transmits the instruction, to the other radio device, for changing the preamble from the first data length to the second data length, which is relatively shorter than the first data length, and for changing the pass frequency band of the reception band filter from the first band to the second band, which is relatively wider than the first band.

2. The radio device according to claim 1, wherein after transmitting the instruction for changing the preamble from the first data length to the second data length, the processor changes the pass frequency band of the reception band filter from the first band into the second band.

3. The radio device according to claim 1, wherein if the packet density is determined to be lower than the prescribed threshold value, the processor transmits the instruction, to the other radio device, for changing the preamble to the first data length or a third data length, which is relatively longer than the first data length, and for changing the pass frequency band of the reception band filter to the first band or a third band, which is relatively narrower than the first band.

4. The radio device according to claim 1, wherein the processor detects the number of other radio devices located around the radio device and determines the packet density according to a detection result.

5. The radio device according to claim 1, wherein the processor determines the packet density according to a reception level of the number of transmission of the signal from the other radio device exceeds a prescribed level.

6. The radio device according to claim 1, wherein the processor determines the packet density according to the number of retransmission of the signal in the radio device.

7. The radio device according to claim 1, wherein, by transmitting, to the other radio device, an address and a data length of the changed preamble by a broadcast transmission, the processor transmits the instruction for changing the preamble from the first data length into the second data length, which is relatively shorter than the first data length.

8. The radio device according to claim 1, wherein the processor sets the first data length so that the measuring circuit measures a reception level of the signal received by each of the plurality of antennas in the preamble.

9. The radio device according to claim 1, wherein the processor sets the second data length when the measuring circuit desires a time as a lower limit to measure the reception level of the signal received by each of the plurality of antennas in the preamble in the signal received through the second band.

10. The radio device according to claim 1, wherein the processor performs setting so that the second band is equal to or narrower than the band in which an increase of a noise power according to a difference of a pass frequency band with the first band is equal to the increase of a reception power gain obtained by an operation of the antenna switch.

11. A radio communication system comprising:
a plurality of radio devices, which communicates with each other, at least one radio device of the plurality of radio devices including
a plurality of antennas which transmits and receives the signal to and from another radio device;
a reception band filter which controls a pass frequency band;
a measuring circuit which measures a reception level of the signal received by each of the plurality of antennas in a preamble in the signal received through the reception band filter;
an antenna switch which switches the plurality of antennas based on a measurement result from the measuring circuit; and
a processor which controls the transmission and reception of the signal of one of the plurality of radio devices and controls the pass frequency band of the reception band filter; and
a management device including a transmitter which transmits, to the other radio device, an instruction for changing the preamble in the signal, which is to be transmitted to the one of the plurality of radio devices;
wherein the processor changes the pass frequency band of the reception band filter from a first band into a second band based on a packet density, and
wherein if the packet density is determined to be higher than a prescribed threshold, the at least one radio device transmits the instruction, to the other radio device, for changing the preamble from a first data length to a second data length, which is relatively shorter than the first data length, and for changing the pass frequency band of the reception band filter from the first band to the second band, which is relatively wider than the first band.

12. The radio communication system according to claim 11, wherein after receiving the instruction from the management device to change the preamble from the data length into the second data length, the processor changes the pass frequency band of the reception band filter from the first band into the second band.

13. The radio communication system according to claim 11, wherein if the packet density is determined to be higher than a prescribed threshold value, the transmitter transmits a request, as the measurement result, for changing the preamble from the first data length into the second data length.

14. The radio communication system according to claim 11, wherein the processor determines the packet density according to the number of other radio devices located around the one of the plurality of radio devices.

15. The radio communication system according to claim 11, wherein the processor determines the packet density according to the number of the signal with the reception level, which is higher than a prescribed level value, of the signal transmitted from the other radio device.

16. The radio device according to claim 11, wherein the processor determines the packet density according to the number of retransmission of the signal in the radio device.

17. A communication control method of a radio device which includes a plurality of antennas transmitting and receiving a signal to and from another radio device, the communication control method comprising:
- measuring a reception level of each of the plurality of antennas in a preamble in the signal received through a reception band filter which controls a pass frequency band;
- switching the plurality of antennas based on the measurement result; and
- transmitting, based on a packet density, an instruction for changing the preamble from a first data length into a second data length to the other radio device, so that the pass frequency band of the reception band filter is changed from a first band into a second band,
- wherein if the packet density is determined to be higher than a prescribed threshold, the instruction is transmitted to the other radio device for changing the preamble from the first data length to the second data length, which is relatively shorter than the first data length, and for changing the pass frequency band of the reception band filter from the first band to the second band, which is relatively wider than the first band.

18. The communication control method according to claim 17, wherein after transmitting the instruction for changing the preamble from the first data length into the second data length, the communication control method changes the pass frequency band of the reception band filter from the first band to the second band.

* * * * *